(12) United States Patent
Nishio

(10) Patent No.: US 10,309,298 B2
(45) Date of Patent: Jun. 4, 2019

(54) CONTROL DEVICE OF AN ENGINE

(71) Applicant: Mazda Motor Corporation, Aki-gun, Hiroshima (JP)

(72) Inventor: Takafumi Nishio, Otake (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 152 days.

(21) Appl. No.: 15/217,916

(22) Filed: Jul. 22, 2016

(65) Prior Publication Data

US 2017/0030260 A1 Feb. 2, 2017

(30) Foreign Application Priority Data

Jul. 29, 2015 (JP) .................. 2015-149840

(51) Int. Cl.
| | |
|---|---|
| F02B 37/18 | (2006.01) |
| F02D 23/00 | (2006.01) |
| F02B 33/40 | (2006.01) |
| F02B 39/08 | (2006.01) |
| F02M 35/10 | (2006.01) |
| F02D 41/00 | (2006.01) |

(Continued)

(52) U.S. Cl.
CPC .......... *F02B 37/183* (2013.01); *F02B 33/40* (2013.01); *F02B 37/18* (2013.01); *F02B 39/08* (2013.01); *F02D 41/0007* (2013.01); *F02D 41/1401* (2013.01); *F02D 41/1445* (2013.01); *F02D 41/2464* (2013.01); *F02M 35/10157* (2013.01); *F02D 2041/1409* (2013.01); *F02D 2041/1422* (2013.01); *F02D 2041/1433* (2013.01); *F02D 2200/0406* (2013.01); *Y02T 10/144* (2013.01)

(58) Field of Classification Search
CPC ........ F02B 37/183; F02B 37/18; F02B 33/40; F02B 39/08; F02D 41/0007; F02D 41/1401; F02D 41/1445; F02D 41/2464; F02D 2041/1409; F02D 2041/1422; F02D 2041/1433; F02D 2200/0406; F02M 35/10157; Y02T 10/144
USPC ...... 60/602, 605.1–605.2; 701/102–104, 108
See application file for complete search history.

(56) References Cited

U.S. PATENT DOCUMENTS 4,672,814 A 6/1987 Abo et al.
4,715,184 A * 12/1987 Oosawa .............. F02D 41/0007
60/602

(Continued)

FOREIGN PATENT DOCUMENTS

JP H0350087 B2 7/1991
JP 2002276382 A 9/2002

*Primary Examiner* — Thai Ba Trieu
(74) *Attorney, Agent, or Firm* — Alleman Hall Creasman & Tuttle LLP

(57) ABSTRACT

To improve the controllability of the feedback control of the boost pressure, an ECU comprises a valve control part that feedback controls a boost pressure of a turbocharger based on a deviation between a target boost pressure and an actual boost pressure, and a determination part that determines whether or not the exhaust state in an exhaust passage can achieve the target boost pressure, and the feedback control includes at least an integral term, and when the determination part determines the exhaust state cannot achieve the target boost pressure, the valve control part reduces the influence of the deviation on the calculation of integral term compared with that when the exhaust state can achieve the target boost pressure.

2 Claims, 5 Drawing Sheets

(51) Int. Cl.
   *F02D 41/14*   (2006.01)
   *F02D 41/24*   (2006.01)

(56) References Cited

U.S. PATENT DOCUMENTS

| | | | | |
|---|---|---|---|---|
| 5,083,434 A * | 1/1992 | Dahlgren | F02B 37/18 60/602 |
| 5,680,763 A * | 10/1997 | Unland | F02B 37/18 60/602 |
| 6,279,551 B1 * | 8/2001 | Iwano | F02B 37/18 123/564 |
| 7,076,954 B1 * | 7/2006 | Sopko, Jr. | F02D 41/0007 60/608 |
| 7,561,956 B2 * | 7/2009 | Ehlers | F02D 41/0007 60/602 |
| 7,707,831 B2 * | 5/2010 | Ballauf | F02D 41/0007 60/602 |
| 7,805,938 B2 * | 10/2010 | Roh | F02B 37/24 60/602 |
| 2011/0225967 A1 * | 9/2011 | Karnik | F02D 41/0007 60/602 |
| 2014/0360178 A1 * | 12/2014 | Wang | F02B 37/18 60/602 |
| 2015/0068203 A1 * | 3/2015 | Wang | F02D 41/0007 60/600 |
| 2015/0275731 A1 * | 10/2015 | Yasui | F02D 41/0007 123/568.21 |

* cited by examiner

CONTROL DEVICE OF AN ENGINE

FIELD OF THE INVENTION

The presently disclosed technology relates to a control device of an engine that has a turbocharger.

BACKGROUND ART

Conventionally, an engine with a turbocharger is known, and in this type of engine, the boost pressure of the turbocharger is suitably adjusted corresponding to an operating state of the engine.

For example, an exhaust passage of the engine according to Patent Document 1 is provided with a bypass passage that bypasses a turbine of the turbocharger, and a bypass valve is provided to adjust a flow rate of exhaust flowing the bypass passage. In this engine, the boost pressure of the turbocharger is adjusted by controlling an opening degree of the bypass valve.

More specifically, the control device of the engine according to Patent Document 1 functions appropriately by switching a feedback control, which controls the opening degree of the bypass valve corresponding to a deviation between an actual value and a target value of a pressure ratio before and after a compressor of the turbocharger, and a non-feedback control in which the deviation is not taken into consideration. Then, when switching from the non-feedback control to the feedback control, the deviation between the actual value and the target value becomes large, and an integral term may be large, so the control device sets the integral term to zero. Accordingly, overshoot or undershoot of the boost pressure is reduced.

RELATED ART

Patent Document

Patent Document 1 Japanese Unexamined Patent Application Publication 2002-276382

SUMMARY OF THE INVENTION

Problems to be Solved by the Invention

In the feedback control, if the integral term becomes too large, responsiveness might be degraded. Therefore, the control device according to Patent Document 1 assumes the switching time from the non-feedback control to the feedback control as a situation in which the integral term becomes large. However, the situation in which the integral term becomes large is not limited to this, and might occur in various situations. Moreover, when determining only the size of the integral term, even in the situation in which the integral term should be considered, the integral term might be ignored. In that case, the accuracy of the boost pressure can be degraded.

The presently disclosed technology is made in consideration of the above, and the object thereof is to improve the controllability of the feedback control of the boost pressure.

BRIEF SUMMARY OF THE INVENTION

The presently disclosed technology is directed to a control system of an engine that comprises a turbocharger having a turbine that is provided to an exhaust passage and a compressor that is provided to an intake passage, a turbine bypass passage for diverting exhaust around the turbine, a wastegate valve provided to the turbine bypass passage for controlling a flow rate of the exhaust flowing in the turbine bypass passage, and a control device. The control device includes a control part for feedback controlling a boost pressure of the turbocharger based on a deviation between a target boost pressure and an actual boost pressure, and a determination part for determining whether or not the exhaust state in the exhaust passage can achieve the target boost pressure, wherein the feedback control includes at least an integral term, and when the determination part determines that the exhaust state cannot achieve the target boost pressure, the control part controls an opening degree of the wastegate valve so as to reduce the influence of the deviation on the calculation of the integral term compared to that when the exhaust state can achieve the target boost pressure.

According to this configuration, when the exhaust state in an exhaust passage cannot achieve the target boost pressure, the influence of the deviation between the target boost pressure and the actual boost pressure on the calculation of the integral term by the feedback control is reduced.

For example, when a flow rate of the exhaust is small, a sufficient turbine flow rate cannot be ensured, so the target boost pressure cannot be achieved. In such a case, a difference between the target boost pressure and the actual boost pressure occurs, and the state with the difference continues until the state in which the exhaust state can achieve the target boost pressure is reached (for example, when the flow rate of the exhaust achieves a target turbine flow rate that is equivalent to the target boost pressure). At this time, if the feedback control is normally executed, the deviation between the target boost pressure and the actual boost pressure is accumulated as the integral term, and an absolute value of the integral term becomes large. Shortly, even though the state changes such that the exhaust state can achieve the target boost pressure and the deviation becomes small, since the absolute value of the integral term has become large by accumulating the deviation, it takes time until the absolute value of the integral term is reduced. As a result, overshoot or undershoot in the boost pressure occurs, and the controllability is degraded.

To begin with, when the exhaust state cannot achieve the target boost pressure, the actual boost pressure cannot be raised to the target boost pressure. Thus, the deviation between the target boost pressure and the actual boost pressure in such a situation cannot be improved by the feedback control of the boost pressure, and should not be considered as the integral term of the feedback control.

Then, in the configuration when the exhaust state cannot achieve the target boost pressure, the influence of the deviation on the calculation of the integral term by the feedback control is reduced. Thus, when the exhaust state cannot achieve the target boost pressure, the deviation between the target boost pressure and the actual boost pressure does not have much influence on the calculation of the integral term. Therefore, while the state in which the exhaust state cannot achieve the target boost pressure continues, the increase of the absolute value of the integral term caused by the deviation is controlled. As a result, when the exhaust state can achieve the target boost pressure, the absolute value of the integral term is not too large, so the overshoot and the undershoot of the actual boost pressure is controlled, and the actual boost pressure can be brought close to the target boost pressure early.

Conversely, when the exhaust state can achieve the target boost pressure, the influence of the deviation on the calculation of the integral term becomes large compared with that when the exhaust state cannot achieve the target boost pressure. Thus, unlike the configuration of the technology of Patent Document 1 in which the feedback control is stopped uniformly when the deviation is large, the feedback control is performed appropriately in consideration of the integral term in the situation that the integral term should be considered. In this way, when the exhaust state can achieve the target boost pressure, by actively using the integral term from the deviation for the feedback control, the boost pressure can be adjusted with high accuracy.

Moreover, the control part calculates the integral term from an integrated value of the deviation, and when the determination part determines that the exhaust state cannot achieve the target boost pressure, the control part may stop the calculation of the integrated value of the deviation.

Thus, when the exhaust state can achieve the target boost pressure, the increase of the absolute value of the integral term caused by the deviation is stopped. Accordingly, the increase of the absolute value of the integral term is more controlled, and when the exhaust state can achieve the target boost pressure, the actual boost pressure can be brought close to the target boost pressure early.

Moreover, the determination part obtains a target turbine flow rate that is a target value of the flow rate of the exhaust flowing to the turbine from the target boost pressure, and obtains an exhaust total flow rate discharging from the engine as the exhaust state in the exhaust passage, and when the exhaust total flow rate is smaller than the target turbine flow rate, it may determine that the exhaust state in the exhaust passage cannot achieve the target boost pressure.

According to this configuration, the exhaust total flow rate is used as the exhaust state. Then, when the exhaust total flow rate is smaller than the target turbine flow rate, the target boost pressure cannot be achieved, so it can then be determined that the exhaust state cannot achieve the target boost pressure.

Alternatively, the determination part obtains a target driving force that is a target value of a driving force of the compressor from the target boost pressure and obtains a maximum driving force of the compressor that can be currently achieved as the exhaust state in the exhaust passage, and when the maximum driving force is smaller than the target driving force, it may determine that the exhaust state in the exhaust passage cannot achieve the target boost pressure.

The maximum driving force relates to a maximum boost pressure that can be currently achieved, and, consequently, it relates to the maximum turbine flow rate that can be currently achieved. Since the maximum turbine flow rate relates to the exhaust total flow rate, as a result, the maximum driving force is correlated with the exhaust state. Therefore, by comparing the maximum driving force with the target driving force, it can be determined that the exhaust state cannot achieve the target boost pressure.

EFFECTS OF THE INVENTION

According to the control device of the engine, the controllability of the feedback control of the boost pressure can be improved.

DETAILED DESCRIPTION OF THE EMBODIMENTS

Hereinafter, an exemplary embodiment will be described in detail with reference to the drawings.
<Embodiment 1>
[Configuration of an Engine]

Figure 1:
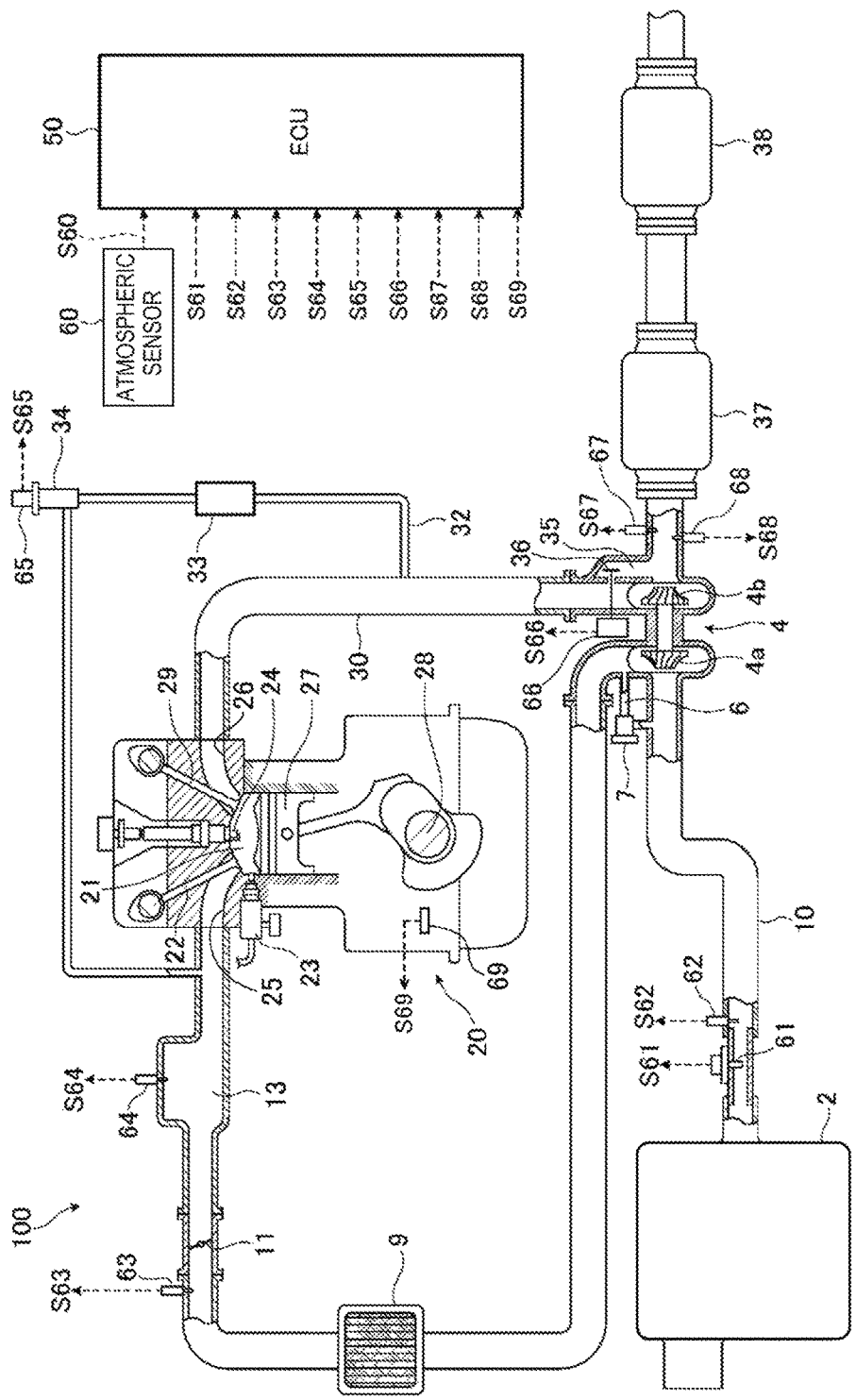
FIG. 1 is a schematic diagram of an engine according to the embodiment 1.

FIG. 1 is a schematic diagram of an engine to which a control device is applied according to the embodiment 1.

As shown in FIG. 1, an engine 100 has an intake passage 10 that intake (air) introduced from outside goes though, an engine body 20 (for example, a gasoline engine) that generates vehicle power by combusting the air fuel mixture of intake supplied from this intake passage 10 and fuel supplied from a fuel injection valve 23, an exhaust passage 30 to which the generated exhaust by combustion in the engine body 20 is discharged, and an Electronic Control Unit (ECU) 50 that controls the engine 100 as a whole.

To the intake passage 10, in order from the upstream side, an air cleaner 2 to purify the intake introduced from the outside, a compressor 4a of a turbocharger 4 to raise pressure of the intake passing through, an intercooler 9 to cool the intake passing through, a throttle valve 11 to adjust an intake amount passing through, and a surge tank 13 to temporarily store the intake to supply to the engine body 20 are provided.

Moreover, an air bypass passage 6, in which a part of the intake turbocharged by the compressor 4a flows back to the upstream side of the compressor 4a as reflux, is provided to the intake passage 10. Specifically, an end of the air bypass passage 6 is connected to the downstream side of the compressor 4a and the intake passage 10 on the upstream side of the throttle valve 11, and the other end is connected to the intake passage 10 on the upstream side of the compressor 4a. Moreover, an air bypass valve 7, which controls the flow rate of the intake flowing in the air bypass passage 6, is provided to the air bypass passage 6.

The engine body 20 has an intake valve 22 that opens and closes an intake port 25, a fuel injection valve 23 that injects fuel to a combustion chamber 21, an ignition plug 24 that ignites the air fuel mixture of the intake supplied in the combustion chamber 21 and fuel, a piston 27 that reciprocates by combustion of air fuel mixture in the combustion chamber 21, a crank shaft 28 that is rotated by the reciprocation of the piston 27, and an exhaust valve 29 that opens and closes an exhaust port 26.

To the exhaust passage 30, in order from the upstream side, a turbine 4b of the turbocharger 4, which is rotated by the passing exhaust and rotary drives the compressor 4a by this rotation, and exhaust purification catalysts 37 and 38, such as NO catalysts, three-way catalysts, or oxidation catalysts which have an exhaust clarification function, are provided.

Moreover, an Exhaust Gas Recirculation (EGR) passage 32, in which the exhaust flows back to the intake passage 10 as reflux, is connected to the exhaust passage 30. One end of this EGR passage 32 is connected to the exhaust passage 30 on the upstream side of the turbine 4b, and the other end is connected to the intake passage 10 on the downstream side of the throttle valve 11. In addition, an EGR cooler 33, which cools the reflux exhaust, and an EGR valve 34, which controls the flow rate of the exhaust flowing in the EGR passage 32, are provided to the EGR passage 32.

Moreover, a turbine bypass passage 35, which diverts the exhaust around the turbine 4b of the turbocharger 4, is provided to the exhaust passage 30. To this turbine bypass passage 35, a wastegate valve (WG valve) 36, which controls the flow rate of the exhaust flowing in the turbine bypass passage 35, is provided. The turbine bypass passage 35 is one example of the bypass passage.

Further, various sensors are provided to the engine 100 shown in FIG. 1. Specifically, in the intake system of the engine 100, an airflow meter 61, which detects an intake airflow rate, and a temperature sensor 62, which detects an intake temperature, are provided to the intake passage 10 (specifically, the intake passage 10 between the air cleaner 2 and the compressor 4a) on the downstream side of the air cleaner 2. Additionally, a pressure sensor 63, which detects a boost pressure, is provided to the intake passage 10 between the compressor 4a and the throttle valve 11, and a pressure sensor 64, which detects an intake manifold pressure, is provided to the intake passage 10 (specifically, in the surge tank 13) on the downstream side of the throttle valve 11.

Moreover, an EGR opening degree sensor 65 for detecting an EGR opening degree that is the opening degree of the EGR valve 34, and a W/G opening degree sensor 66 for detecting a W/G opening degree that is the opening degree of the WG valve 36 are provided to the exhaust system of the engine 100. In addition, an O₂ sensor 67 for detecting an oxygen concentration in the exhaust and a temperature sensor 68 for detecting an exhaust temperature are provided to the exhaust passage 30 (specifically, the exhaust passage 30 between the turbine 4b and the exhaust purification catalyst 37) on the downstream side of the turbine 4b.

To the engine body 20, a crank angle sensor 69 for detecting a crank angle is provided.

The airflow meter 61 supplies a detection signal S61 corresponding to the detected intake airflow rate to the ECU 50, the temperature sensor 62 supplies a detection signal S62 corresponding to the detected intake temperature to the ECU 50, the pressure sensor 63 supplies a detection signal S63 corresponding to the detected boost pressure to the ECU 50, the pressure sensor 64 supplies a detection signal S64 corresponding to the detected intake manifold pressure to the ECU 50, the EGR opening degree sensor 65 supplies a detection signal S65 corresponding to the detected EGR opening degree to the ECU 50, the W/G opening degree sensor 66 supplies a detection signal S66 corresponding to the detected W/G opening degree to the ECU 50, the O₂ sensor 67 supplies a detection signal S67 corresponding to the detected oxygen concentration to the ECU 50, and the temperature sensor 68 supplies a detection signal S68 corresponding to the detected exhaust temperature to the ECU 50. The crank angle sensor 69 supplies a detection signal S69 corresponding to the detected crank angle to the ECU 50. Moreover, an atmospheric sensor 60 for detecting the atmospheric pressure is provided to the engine 100, and this atmospheric sensor 60 supplies a detection signal S60 corresponding to the detected atmospheric pressure to the ECU 50.

The ECU 50 is configured by the computer having a CPU and internal memories such as ROM or RAM to store various programs executed on the CPU (including the basic control program such as an operating system (OS) and application programs that are executed on the OS and perform specific functions) and various data. The ECU 50 executes various controls or processing based on the detection signal supplied from the various sensors mentioned above.

Figure 2:
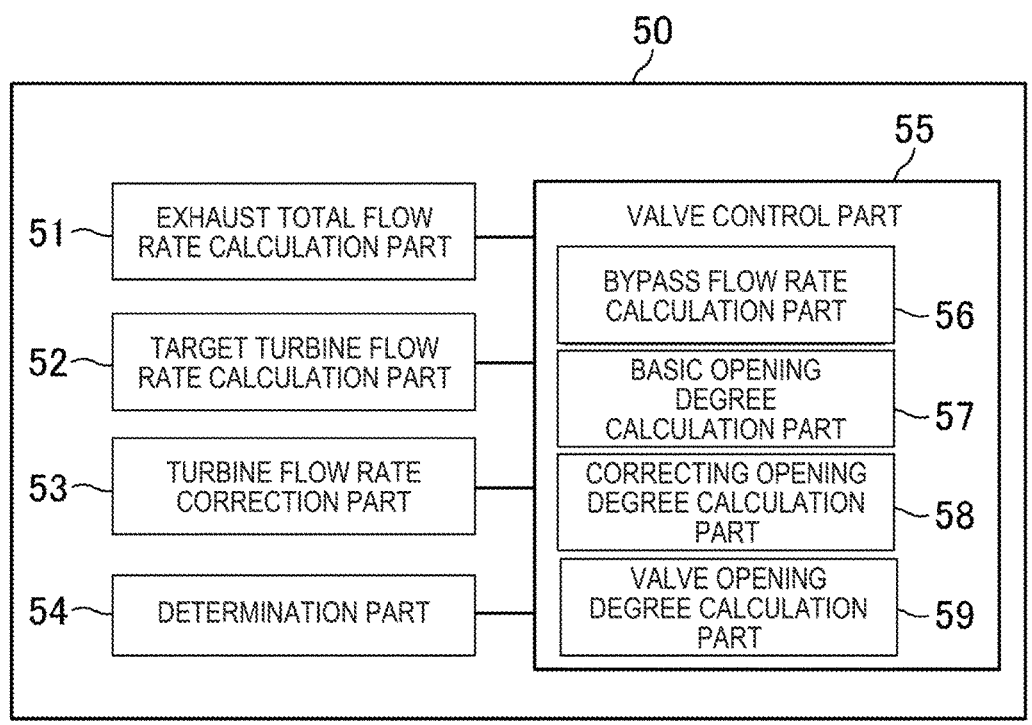
FIG. 2 is a function block diagram of an Electronic Control Unit (ECU) with focus on a related part of a valve opening degree control of a wastegate valve.

For example, the ECU 50 controls the boost pressure of the turbocharger 4 by controlling the opening degree of the WG valve 36. FIG. 2 shows a function block diagram of the ECU 50 with focus on related parts of the valve opening degree control of the WG valve 36. As shown in FIG. 2, the ECU 50 functionally has an exhaust total flow rate calculation part 51 for calculating the total flow rate of exhaust discharged from the engine, a target turbine flow rate calculation part 52 for calculating the target turbine flow rate that is a target value of the flow rate of exhaust passing the turbine, a turbine flow rate correction part 53 for correcting the target turbine flow rate based on the actual boost pressure of the compressor 4a, a determination part 54 for determining whether or not the exhaust state of the exhaust passage 30 can achieve the target boost pressure, and a valve control part 55 for controlling the opening degree of the WG valve 36. Further, the ECU 50 is one example of the control device.

The valve control part 55 feedback controls the valve opening degree of the WG valve 36 based on the deviation between the target boost pressure and the actual boost pressure while controlling the valve opening degree of the WG valve 36 based on the target turbine flow rate. The valve control part 55 comprises a bypass flow rate calculation part 56 for calculating a bypass flow rate, a basic opening degree calculation part 57 for calculating a basic opening degree of the WG valve 36 corresponding to the bypass flow rate, a correcting opening degree calculation part 58 for calculating a correcting opening degree to correct the basic opening degree, and a valve opening degree calculation part 59 for calculating the valve opening degree of the WG valve 36. The valve control part 55 operates an actuator of the WG valve 36 based on the calculated valve opening degree.

Figure 3:
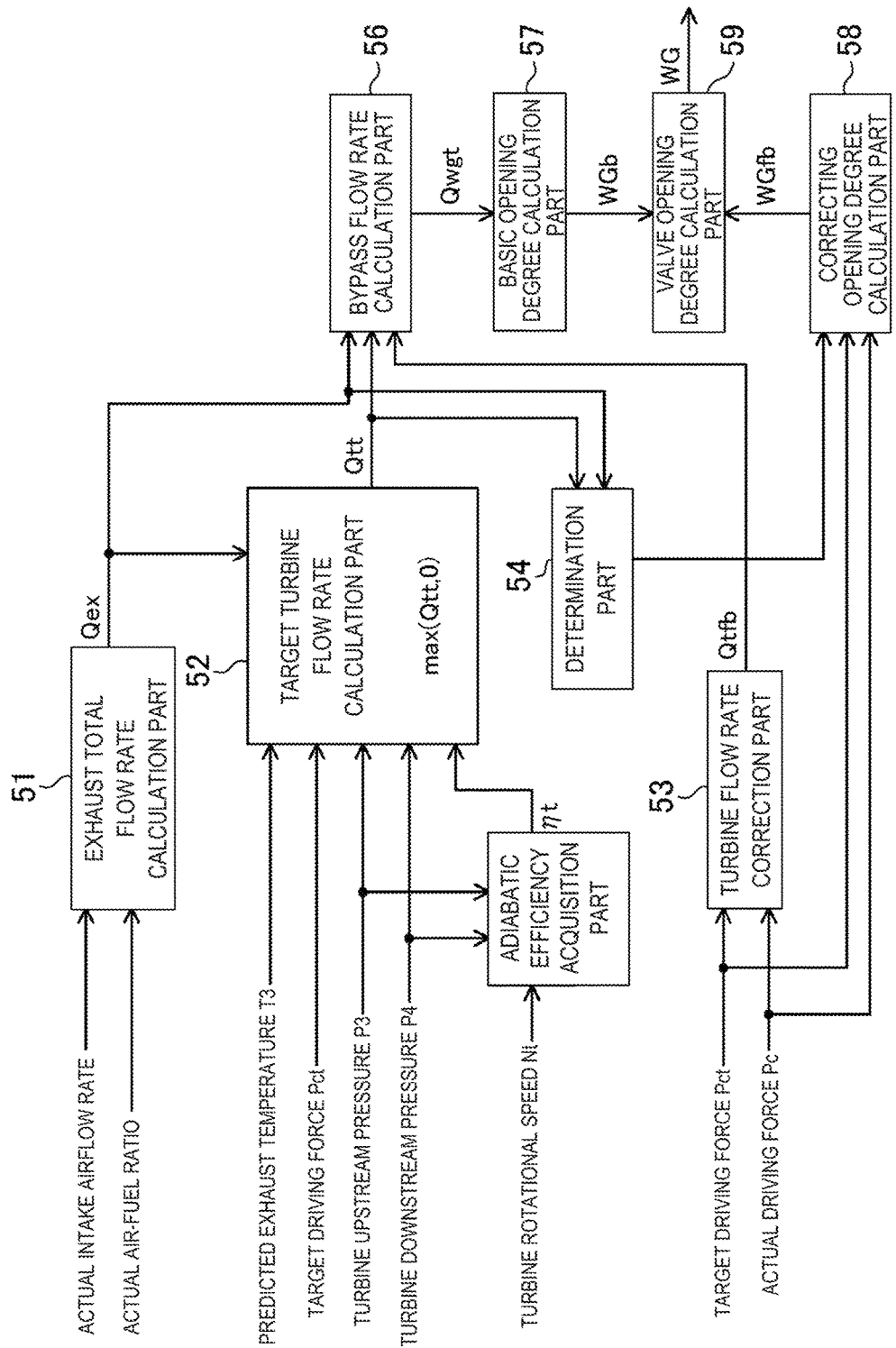
FIG. 3 is a block diagram showing a calculation method of a valve opening degree of the wastegate valve.

FIG. 3 is a block diagram showing a calculation method of the valve opening degree of the WG valve 36.

<Exhaust Total Flow Rate Calculation>

An exhaust total flow rate calculation part 51 obtains an exhaust total flow rate Qex discharged from the engine body 20 from an actual intake airflow rate and an actual air-fuel ratio. The actual intake airflow rate is detected by an airflow meter 61, and the actual air-fuel ratio is obtained from the oxygen concentration detected by the O₂ sensor 67.

<Target Turbine Flow Rate Calculation>

A target turbine flow rate calculation part 52 calculates a target turbine flow rate Qtt from Equation (1) using a predicted temperature of the exhaust (hereinafter, "predicted exhaust temperature") T3, a target driving force Pct of the compressor 4a, a pressure of the exhaust (hereinafter, "turbine upstream pressure") P3 on the upstream side of the turbine 4b, a pressure of the exhaust (hereinafter, "turbine downstream pressure") P4 on the downstream side of the turbine 4b, and the adiabatic efficiency ηt of the turbine 4b.

$$Qtt = \frac{Pct}{\eta t \cdot \frac{\kappa ex}{\kappa ex - 1} \cdot Rex \cdot T3 \cdot \left\{1 - \left(\frac{P4}{P3}\right)^{\frac{\kappa ex - 1}{\kappa ex}}\right\}} \quad (1)$$

[Equation 1] Here, κex is the specific heat ratio of the exhaust, and Rex is the gas constant of the exhaust.

The target driving force Pct is obtained from the target boost pressure and the target intake airflow rate. Specifically, the target boost pressure is obtained from a rotational speed of the engine body 20, a target charging efficiency, and a target intake manifold pressure. The rotational speed is obtained from the crank angle detected by the crank angle sensor 69. The target charging efficiency is obtained from a target indicated mean effective pressure, the air-fuel ratio, and a thermal efficiency of the engine body 20. The target indicated mean effective pressure is obtained from a required output torque, and the required output torque is obtained from the rotational speed of the engine body 20 and an accelerator opening degree. The thermal efficiency is obtained from the rotational speed and the charging efficiency. A thermal efficiency map, in which the thermal efficiency corresponding to the rotational speed and the charging efficiency was defined, is stored in the memory, and the thermal efficiency is obtained by checking the rotational speed and the charging efficiency against the thermal efficiency map. The charging efficiency is obtained from the actual intake airflow rate and the intake temperature detected by the temperature sensor 62. The target intake manifold pressure is obtained from the target charging efficiency, the intake manifold inside temperature, and the predetermined intake manifold volume. Meanwhile, the target intake airflow rate is obtained from the target charging efficiency.

The turbine upstream pressure P3 is obtained from the actual driving force Pc. A pressure ratio map, in which the turbine pressure ratio P3/P4 (the ratio between the turbine upstream pressure P3 and the turbine downstream pressure P4) corresponding to the actual driving force Pc was defined, is stored in the memory, and the turbine pressure ratio P3/P4 is obtained by checking the actual driving force Pc against the pressure ratio map. The turbine downstream pressure P4 is obtained by the pressure of a tail pipe (the detection value of the atmospheric sensor 60), a turbine downstream passage flow rate, and a pipe friction coefficient from downstream of the turbine to the tail pipe.

The predicted exhaust temperature T3 is obtained from the rotational speed of the engine body 20 and the charging efficiency. An exhaust temperature map, in which the predicted exhaust temperature corresponding to the rotational speed and the charging efficiency was defined, is stored in the memory, and the predicted exhaust temperature T3 is obtained by checking the rotational speed and the charging efficiency against the exhaust temperature map.

The adiabatic efficiency ηt of the turbine 4b is obtained from the turbine rotational speed Nt and the turbine pressure ratio P3/P4. An adiabatic efficiency map, in which the adiabatic efficiency ηt corresponding to a turbine rotational speed Nt and the turbine pressure ratio P3/P4 was defined, is stored in the memory, and the adiabatic efficiency ηt is obtained by checking the turbine rotational speed Nt and the turbine pressure ratio P3/P4 against the adiabatic efficiency map.

The target turbine flow rate calculation part 52 outputs the target turbine flow rate Qtt as zero when the target turbine flow rate Qtt (hereinafter, "calculated value") calculated by Equation (1) is less than zero. Thus, the output value of the target turbine flow rate Qtt is greater than or equal to zero.

<Turbine Flow Rate Correction>

The turbine flow rate correction part 53 calculates the correcting flow rate Qtfb as a value equivalent to the boost pressure of the compressor 4a by using the actual driving force Pc of the compressor 4a. Specifically, the turbine flow rate correction part 53 calculates the correcting flow rate Qtfb to feedback control the target turbine flow rate Qtt from the deviation ΔP (hereinto, the value is that the actual driving force Pc was subtracted from the target driving force Pct, and hereinafter referred to as "driving force deviation") between the target driving force Pct and the actual driving force Pc. When the actual driving force Pc is smaller than the target driving force Pct, the correcting flow rate Qtfb becomes a positive value in order to increase the turbine flow rate. On the other hand, when the actual driving force Pc is larger than the target driving force Pct, the correcting flow rate Qtfb becomes a negative value in order to decrease the turbine flow rate. At this point, the actual driving force Pc is calculated from the actual boost pressure and the actual intake airflow rate. The actual boost pressure is detected by the pressure sensor 63. The actual intake airflow rate is calculated from the actual intake airflow rate detected by the airflow meter 61 or the actual intake manifold pressure detected by the pressure sensor 64.

<Determination>

A determination part 54 determines whether or not the exhaust state can achieve the target boost pressure from the turbine flow rate. Specifically, the determination part 54 determines whether or not the exhaust total flow rate Qex is greater than or equal to the target turbine flow rate Qtt. When the exhaust total flow rate Qex is smaller than the target turbine flow rate Qtt, even if all the exhaust total flow rate Qex is flowed to the turbine 4b by fully closing the WG valve 36, the actual turbine flow rate does not reach the target turbine flow rate Qtt. Thus, the target boost pressure cannot be achieved. Therefore, when the exhaust total flow rate Qex is smaller than the target turbine flow rate Qtt, it can be determined that the exhaust state cannot achieve the target boost pressure, and when the exhaust total flow rate Qex is greater than or equal to the target turbine flow rate Qtt, it can be determined that the exhaust state can achieve the target boost pressure. When the exhaust total flow rate Qex is greater than or equal to the target turbine flow rate Qtt, the determination part 54 sets a transient determination flag to "zero," but on the other hand, when the exhaust total flow rate Qex is smaller than the target turbine flow rate Qtt, the determination part 54 sets the transient determination flag to "one."

For example, when accelerating from the idling operating state, since the acceleration starts from the small exhaust total flow rate Qex, the exhaust total flow rate Qex tends to be smaller than the target turbine flow rate Qtt. In this way, in case of the acceleration from the small exhaust total flow rate Qex, and also the transient time until when the exhaust total flow rate Qex is sufficiently increased, the transient determination flag might be "one."

Moreover, the determination part 54 may determine that the exhaust state can achieve the target boost pressure based on the difference, by which the target turbine flow rate Qtt is subtracted from the exhaust total flow rate Qex, being greater than or equal to the predetermined threshold value. Therefore, since the exhaust total flow rate Qex and the target turbine flow rate Qtt can include an error, when the exhaust total flow rate Qex is larger than the target turbine flow rate Qtt in a certain degree, it determines that the exhaust state can achieve the target boost pressure. Accordingly, due to an error of the exhaust total flow rate Qex and the target turbine flow rate Qtt, even though the exhaust state actually cannot achieve the target boost pressure, the possibility of the erroneous determination, of which the exhaust state can achieve the target boost pressure, can be reduced.

<Valve control part>

The bypass flow rate calculation part 56 calculates the bypass flow rate Qwgt, which is the flow rate of the exhaust flowing in the turbine bypass passage 35, from the exhaust total flow rate Qex output from the exhaust total flow rate calculation part 51, the target turbine flow rate Qtt output from the target turbine flow rate calculation part 52, and the correcting flow rate Qtfb output from the turbine flow rate correction part 53. Specifically, the bypass flow rate calculation part 56 calculates the bypass flow rate Qwgt from the following Equation (2).

$$Qwgt=Qex-(Qtt+Qtfb) \quad (2)$$

When the calculated bypass flow rate Qwgt is less than zero, the bypass flow rate calculation part 56 sets the bypass flow rate Qwgt to zero. Thus, the bypass flow rate Qwgt is greater than or equal to zero. The negative value of the bypass flow rate Qwgt means that the exhaust reflux flows back in the turbine bypass passage 35. Since such a situation cannot occur, when the calculated value of the bypass flow rate Qwgt is less than 0, the bypass flow rate calculation part 56 sets the bypass flow rate Qwgt to zero.

Next, the basic opening degree calculation part 57 calculates a target opening area Swgt of the WG valve 36 from the bypass flow rate Qwgt, the turbine upstream pressure P3, the turbine downstream pressure P4, and the predicted exhaust temperature T3, and calculates the basic opening degree WGb of the valve opening degree of the WG valve 36 from the target opening area Swgt. An opening degree map, in which the basic opening degree WGb corresponding to the target opening area Swgt was defined, is stored in the memory, and the basic opening degree WGb is obtained by checking the target opening area Swgt against the opening degree map.

The correcting opening degree calculation part 58 calculates the correcting opening degree WGfb to feedback control the valve opening degree of the WG valve 36 from the driving force deviation ΔP (hereinto, the value is that the target driving force Pc was subtracted from the actual driving force Pct. In the case of the calculation of the correcting flow rate Qtfb, the sign is opposite) between the target driving force Pct and the actual driving force Pc. When the actual driving force Pc is smaller than the target driving force Pct, (that is, when the driving force deviation ΔP is negative), the correcting opening degree WGfb becomes a negative value in order to reduce the bypass flow rate Qwgt (that is, to reduce the valve opening degree). On the other hand, when the actual driving force Pc is larger than the target driving force Pct (that is, the driving force deviation ΔP is positive), the correcting opening degree WGfb becomes a positive value in order to increase the bypass flow rate Qwgt (that is, to increase the valve opening degree). The feedback control of the valve opening degree is a PID control, and the correcting opening degree WGfb includes a proportional term FBp, an integral term FBi, and a derivative term FBd. The proportional term FBp is the correction amount that is proportional to the driving force deviation ΔP. The integral term FBi is the correction amount corresponding to the time integration of the driving force deviation. The derivative term FBd is the correction amount corresponding to the change rate of the driving force deviation. Moreover, the correcting opening degree WGfb is described in the following Equation (3).

$$WGfb=FBp+FBi+FBd \quad (3)$$

Accordingly, the correcting opening degree calculation part 58 calculates the amount of which the integral term FBi of the correcting opening degree WGfb exceeds the predetermined threshold value as a learning amount, in order to reduce the influence on the individual difference of the turbocharger 4 or the dispersion due to the secular change and the like.

Moreover, the target driving force Pct is calculated from the target boost pressure and the actual driving force Pc is calculated from the actual boost pressure. Therefore, the feedback control based on the deviation between the target driving force Pct and the actual driving force Pc is substantially equal to the feedback control based on the deviation between the target boost pressure and the actual boost pressure.

Eventually, the valve opening degree calculation part 59 outputs the valve opening degree WG shown in the following Equation (4) from the basic opening degree WGb, the correcting opening degree WGfb, and the learning amount. Moreover, since the valve opening degree of the WG valve 36 cannot be a negative value, when the valve opening degree WG calculated from Equation (4) is less than zero, the valve opening degree WG is set zero.

$$WG=WGb+WGfb+\text{learning amount} \quad (4)$$

The valve control part 55 outputs signals corresponding to the valve opening degree WG to the actuator of the WG valve 36 and operates the WG valve 36.

<Valve Opening Degree Control>

In this way, the valve control part 55 feedback controls the valve opening degree of the WG valve 36 based on the driving force deviation ΔP (specifically, based on the deviation between the target boost pressure and the actual boost pressure).

Figure 4:
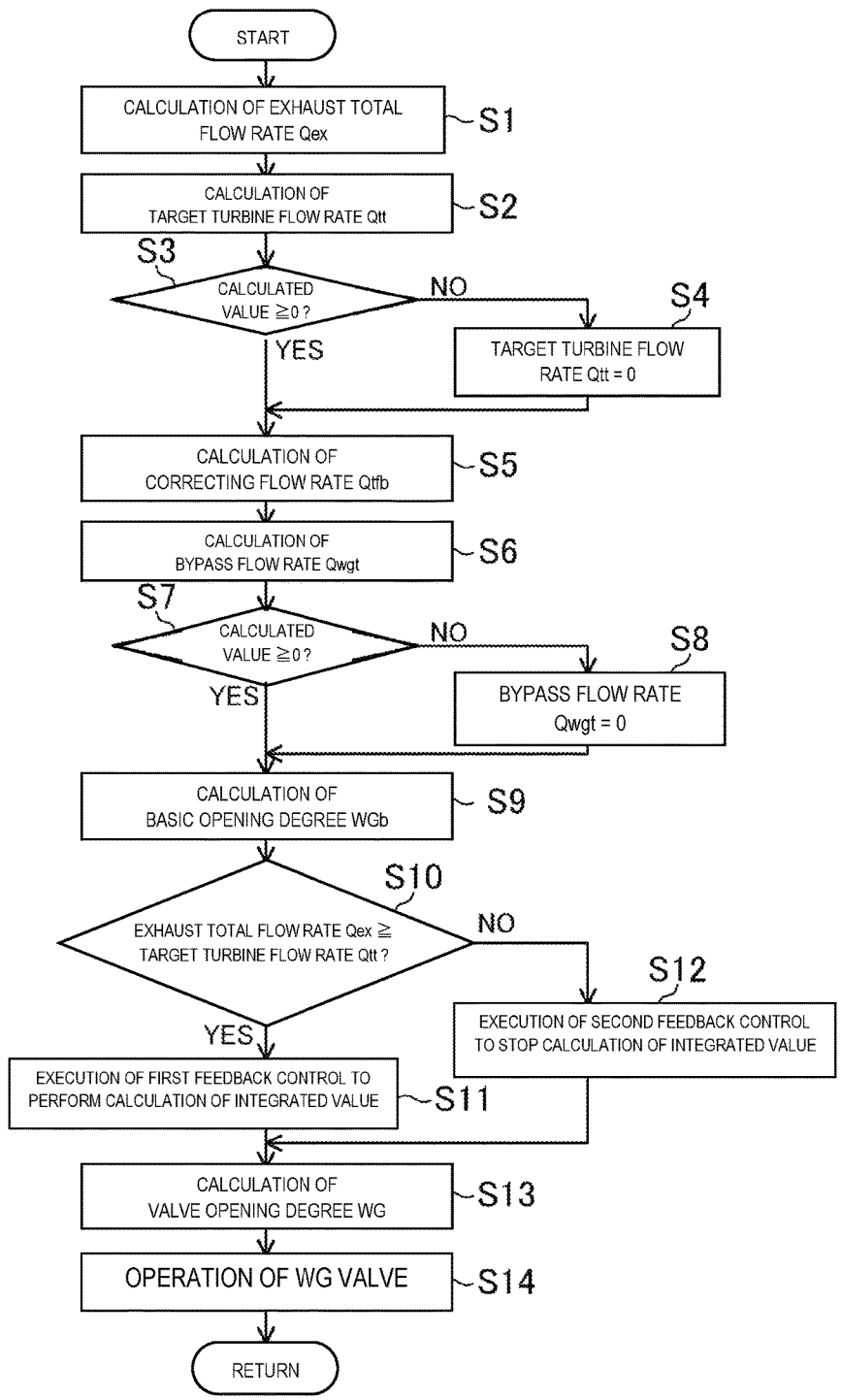
FIG. 4 is a flowchart showing the valve opening degree control of the wastegate valve.

At this point, the valve control part 55 performs by switching a first feedback control and a second feedback control according to the transient determination flag. Therefore, the valve control part 55 changes the contents of the feedback control by whether or not the exhaust state can achieve the target boost pressure. Hereinafter, with reference to the flowchart shown in FIG. 4, the valve opening degree control of the WG valve 36 will be described in more detail.

First, in Step S1, the exhaust total flow rate calculation part 51 obtains the exhaust total flow rate Qex.

Next, in Step S2, the target turbine flow rate calculation part 52 calculates the target turbine flow rate Qtt from Equation (1).

Moreover, at Step S3 the target turbine flow rate calculation part 52 determines whether or not the calculated value of the target turbine flow rate Qtt is greater than or equal to zero. When the calculated value is less than zero, the target turbine flow rate calculation part 52 sets the target turbine flow rate Qtt=0 in Step S4. When the calculated value is greater than or equal to zero, the target turbine flow rate calculation part 52 sets the target turbine flow rate Qtt=the calculated value and proceeds to Step S5. In this way, when the calculated value is less than zero, the target turbine flow rate Qtt=0, and when the calculated value is greater than or equal to zero, the target turbine flow rate Qtt=the calculated value.

Next, in Step S5, the turbine flow rate correction part 53 calculates the correcting flow rate Qtfb from the target driving force Pct and the actual driving force Pc.

In Step S6, the bypass flow rate calculation part 56 calculates the bypass flow rate Qwgt from the exhaust total flow rate Qex, the target turbine flow rate Qtt, and the correcting flow rate Qtfb.

Moreover, the bypass flow rate calculation part 56 determines whether or not the calculated value of the bypass flow rate Qwgt is greater than or equal to zero in Step S7. When the calculated value is less than zero, the bypass flow rate calculation part 56 sets the bypass flow rate Qwgt=0 in Step S8. When the calculated value is greater than or equal to zero, the bypass flow rate calculation part 56 sets the bypass flow rate Qwgt=the calculated value and proceeds to Step S9.

In Step S9, the basic opening degree calculation part 57 calculates the basic opening degree WGb of the WG valve 36 from the bypass flow rate Qwgt.

In Step S10, the determination part 54 determines whether or not the exhaust state can achieve the target boost pressure based on the turbine flow rate. Specifically, the determination part 54 determines whether or not the exhaust total flow rate Qex is greater than or equal to the target turbine flow rate Qtt, and when the exhaust total flow rate Qex is greater than or equal to the target turbine flow rate Qtt, it sets the transient determination flag "0", but on the other hand, when the exhaust total flow rate Qex is smaller than the target turbine flow rate Qtt, it sets transient determination flag "1."

When the transient determination flag is "0", in Step S11, the correcting opening degree calculation part 58 calculates the correcting opening degree WGfb for the first feedback control. A first feedback control is a regular feedback control. In Step S11, when controlling the valve opening degree corresponding to the driving force deviation ΔP, the correcting opening degree calculation part 58 calculates the proportional term FBp, the integral term FBi, and the derivative term FBd by the predetermined calculation method so as to control the boost pressure appropriately (for example, with intended responsiveness). For example, the proportional term FBp is obtained from the driving force deviation ΔP and the predetermined gain Kp, the integral term FBi is obtained from the integrated value of the driving force deviation ΔP and the predetermined gain Ki, and the derivative term FBd is obtained from the derivative value of the driving force deviation ΔP and the predetermined gain Kd.

Meanwhile, when the transient determination flag is "1", in Step S12, the correcting opening degree calculation part 58 calculates the correcting opening degree WGfb for a second feedback control. The second feedback control is the feedback control with which the increase of the integral term FBi is controlled compared with the first feedback control. In Step S12, the influence of the driving force deviation ΔP on the integral term FBi becomes small compared with the first feedback control. Specifically, the correcting opening degree calculation part 58 stops the calculation of the integrated value of the driving force deviation ΔP when calculating the integral term FBi. The integrated value of the driving force deviation ΔP is maintained at the value it had when starting a calculation of the correcting opening degree WGfb for the second feedback control, therefore the integral term FBi is also maintained at the value it had when starting the calculation. Moreover, the proportional term FBp and the derivative term FBd are calculated similar to the first feedback control.

Then, the valve opening degree calculation part 59 calculates the valve opening degree WG from the basic opening degree WGb and the correcting opening degree WGfb in Step S13. At this time, if a learning amount is set, the valve opening degree calculation part 59 calculates the valve opening degree WG in consideration of the learning amount too.

Next, in Step S14, the valve control part 55 operates the WG valve 36 corresponding to the valve opening degree WG. Thus, the opening degree of the WG valve 36 is adjusted to the valve opening degree WG.

In this way, in the valve opening degree control, when the transient determination flag is "0" (that is, when the exhaust total flow rate Qex is greater than or equal to the target turbine flow rate Qtt), the valve opening degree WG is feedback controlled by the first feedback control based on the driving force deviation ΔP. Accordingly, the boost pressure is adjusted with the desired responsiveness and stability. When the exhaust total flow rate Qex is larger than the target turbine flow rate Qtt, the WG valve 36 is normally opened, a part of the exhaust total flow rate Qex circulates the turbine bypass passage 35, and the actual turbine flow rate is adjusted so as to be the target turbine flow rate Qtt. Then, the opening degree of the WG valve 36 is adjusted corresponding to the driving force deviation ΔP, and accordingly, the actual turbine flow rate is adjusted, thereby, the actual boost pressure is adjusted to the target boost pressure. After this adjustment, the WG valve 36 is adjusted again based on the driving force deviation ΔP. By repeating these kinds of processes, the boost pressure is adjusted with the desired responsiveness and stability. At this point, the integral term FBi of the correcting opening degree WGfb is calculated so as to improve the stability of the boost pressure control with due consideration for the integrated value of the driving force deviation ΔP.

Meanwhile, when the transient determination flag is "1" (that is, when exhaust total flow rate Qex is smaller than the target turbine flow rate Qtt), the valve opening degree WG is feedback controlled based on the driving force deviation ΔP by the second feedback control. In the second feedback control, when calculating the integral term FBi, the calculation of the integrated value of the driving force deviation ΔP is stopped. When the exhaust total flow rate Qex is smaller than the target turbine flow rate Qtt, the actual turbine flow rate does not reach the target turbine flow rate Qtt, so the actual boost pressure does not reach target boost pressure. Therefore, the actual driving force Pc is smaller than the target driving force Pct. At this time, since the WG valve 36 is in a fully closed state, it has no way to reduce the absolute value of the driving force deviation ΔP other than waiting for the increase of the exhaust total flow rate Qex. The driving force deviation ΔP at this point cannot be handled by adjusting the opening degree of the WG valve 36. Therefore, the integrated value of the driving force deviation ΔP should not be used for adjusting the valve opening degree as the integral term FBi. Accordingly, in the second feedback control, the calculation of the integrated value of the driving force deviation ΔP is stopped. Even if the driving force deviation ΔP is generated, the increase of the absolute value of the integral term FBi is restrained. Accordingly, the exhaust total flow rate Qex is larger than the target turbine flow rate Qtt, and when starting to adjust the turbine flow rate by opening the WG valve 36, the boost pressure can be adjusted early and stably.

Specifically, when the exhaust total flow rate Qex is smaller than the target turbine flow rate Qtt, the actual driving force Pc is smaller than the target driving force Pct, so the driving force deviation ΔP(=the actual driving force Pc−the target driving force Pct) becomes continuously a negative value for a while. At this point, if the correcting opening degree WGfb is calculated by the first feedback control, the absolute value of the integral term FBi is getting large.

Presently, the actual turbine flow rate is increased corresponding to the increase of the exhaust total flow rate Qex, and the actual driving force Pc exceeds the target driving force Pct, and then the driving force deviation ΔP becomes a positive value. Thus, the actual turbine flow rate needs to be reduced by opening the WG valve 36. However, if the integral term FBi is large, even though the driving force deviation ΔP becomes positive, the integral term FBi does not become a positive value immediately, and as a result, the correcting opening degree WGfb does not become a positive value immediately, or the correcting opening degree WGfb does not easily reach the desired positive value. Therefore, the valve opening degree is not corrected to increase the amount immediately until the desired value is reached. Thus, it requires time until the actual boost pressure is adjusted to the target boost pressure.

On the other hand, in the second feedback control, while the exhaust total flow rate Qex is smaller than the target turbine flow rate Qtt, the increase of the absolute value of the integral term FBi is restrained. Therefore, when the actual turbine flow rate is increased corresponding to the increase of the exhaust total flow rate Qex, and the driving force deviation ΔP becomes a positive value (that is, when changing to the first feedback control), the integral term FBi is small, so the correcting opening degree WGfb becomes the desired positive value early, and the valve opening degree is adjusted to the desired value early. As a result, the boost pressure can be adjusted early and stably.

As above, the ECU 50 comprises the valve control part 55 that feedback controls the boost pressure of the turbocharger 4 based on the deviation between the target boost pressure and the actual boost pressure, and the determination part 54 that determines whether or not the exhaust state in the exhaust passage 30 can achieve the target boost pressure. Additionally, the feedback control includes at least the integral term FBi, and when the determination part 54 determines the exhaust state cannot achieve the target boost pressure, the valve control part 55 reduces an influence of the deviation on the calculation of integral term FBi compared with that when the exhaust state can achieve the target boost pressure.

According to this configuration, when the exhaust state cannot achieve the target boost pressure, even though the deviation between the target boost pressure and the actual boost pressure is generated, the increase of the absolute value of the integral term FBi is restrained. Therefore, when the exhaust state can achieve the target boost pressure and the control of the boost pressure starts, the correction amount of the feedback control is adjusted to the appropriate value early, the overshoot and the undershoot of the actual boost pressure are restrained, and the actual boost pressure can get close to the target boost pressure early.

On the other hand, when the exhaust state can achieve the target boost pressure, the integral term FBi is calculated with due consideration for the deviation between the target boost pressure and the actual boost pressure by the first feedback control, so that the boost pressure can be controlled stably.

Moreover, since the valve control part 55 calculates the integral term FBi from the integrated value of the deviation, when the determination part 54 determines that the exhaust state cannot achieve the target boost pressure, the calculation of the integrated value of the deviation is stopped.

According to this configuration, since the increase of the absolute value of the integral term FBi is restrained further, when the exhaust state can achieve the target boost pressure, the actual boost pressure can get close to the target boost pressure early.

In addition, the determination part 54 obtains the target turbine flow rate Qtt, which is the target value of the exhaust flow rate flowing in the turbine 4b, from the target boost pressure, and obtains the exhaust total flow rate Qex discharged from the engine body 20 as the exhaust state in the exhaust passage 30. When the exhaust total flow rate Qex is smaller than the target turbine flow rate Qtt, it determines that the exhaust state in the exhaust passage 30 cannot achieve the target boost pressure.

According to this configuration, the exhaust total flow rate Qex is used as the exhaust state. Then, when the exhaust total flow rate Qex is smaller than the target turbine flow rate Qtt, the target boost pressure cannot be achieved. Thus, by using the exhaust total flow rate Qex as the exhaust state, it easily determines whether or not the exhaust state can achieve the target boost pressure.

<Embodiment 2>

Figure 5:
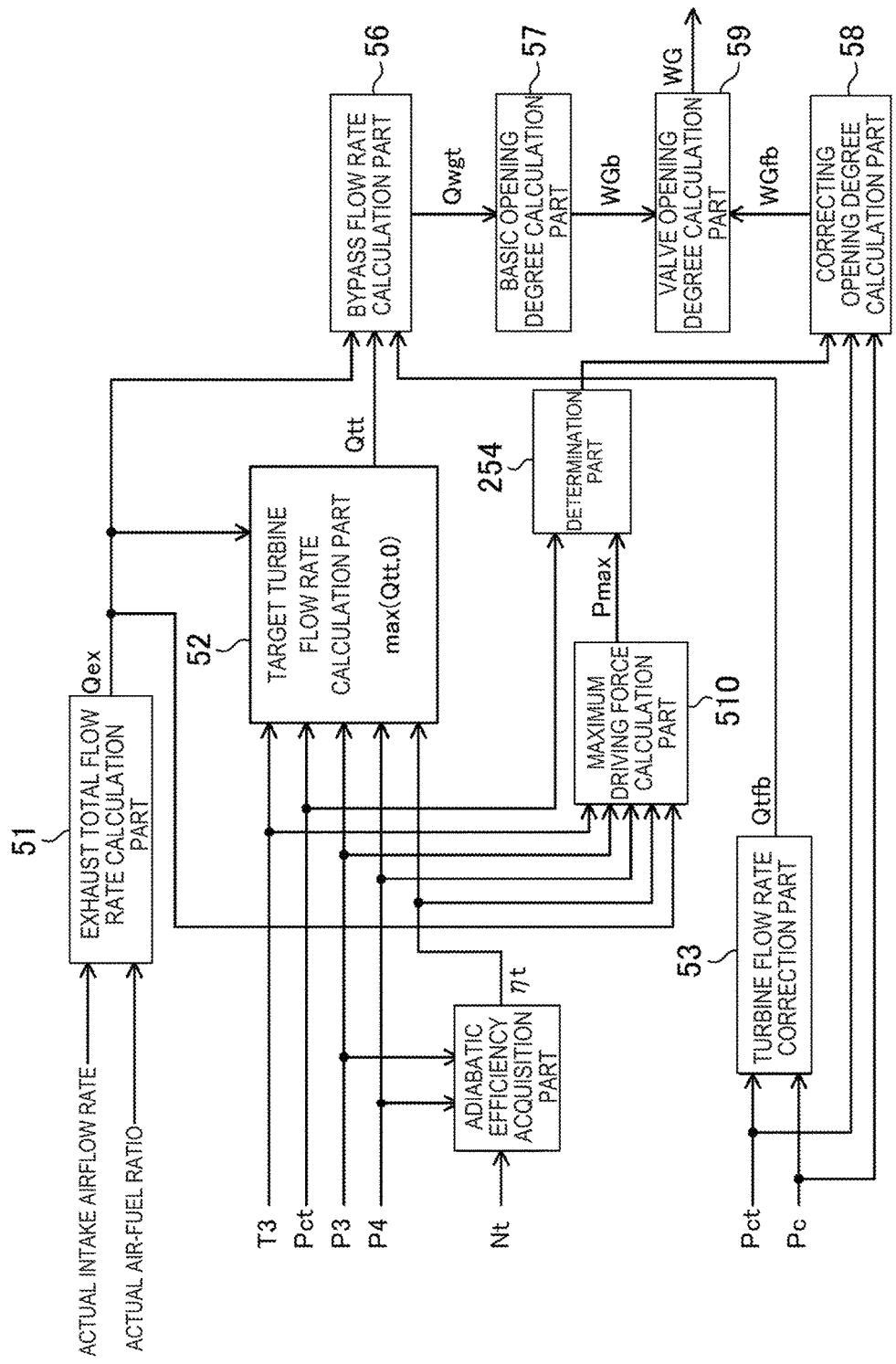
FIG. 5 is a block diagram showing a calculation method of the valve opening degree of the wastegate valve according to the embodiment 2.

Next, the control device of the engine according to the embodiment 2 will be described. In FIG. 5, a block diagram showing a calculation method of the valve opening degree of the WG valve 36 according to the embodiment 2 is shown. The control device of the embodiment 2 is different from the embodiment 1 in determination method by the determination part 54. Then, regarding the same configurations in the embodiment 2 as those in the embodiment 1, the same numerical references are indicated to omit the explanation, and the different parts from the embodiment 1 are mainly explained.

A determination part 254 according to the embodiment 2 determines whether or not the exhaust state can achieve the target boost pressure based on the driving force of the compressor 4a.

Specifically, the ECU 50 comprises a maximum driving force calculation part 510 for calculating the currently achievable maximum driving force (hereinafter, "maximum driving force Pmax") of the compressor 4a. The maximum driving force calculation part 510 calculates the maximum driving force Pmax from the following Equation (5) by using the exhaust total flow rate Qex, the predicted exhaust temperature T3, the turbine pressure ratio P3/P4, and the adiabatic efficiency of the turbine 4b.

$$P\max = Qex \cdot \frac{\kappa ex}{\kappa ex - 1} \cdot T3 \cdot \left\{ 1 - \left( \frac{P4}{P3} \right)^{\frac{\kappa ex - 1}{\kappa ex}} \right\} \cdot \eta t \tag{5}$$

[Equation 5] The maximum driving force Pmax is the maximum driving force which the current exhaust state can achieve.

A determination part 254 determined whether or not the exhaust state can achieve the target boost pressure based on the driving force of the compressor 4a. Specifically, the determination part 254 determines whether or not the maximum driving force Pmax is greater than or equal to the target driving force Pct. When the maximum driving force Pmax is smaller than the target driving force Pct, even though all of the exhaust total flow rate Qex is flowed to the turbine 4b by fully closing the WG valve 36, the actual driving force Pc does not reach the target driving force Pct. Thus, the target boost pressure cannot be achieved. Therefore, when the maximum driving force Pmax is smaller than the target driving force Pct, it is possible to determine that the exhaust state cannot achieve the target boost pressure. When the maximum driving force Pmax is greater than or equal to the target driving force Pct, it is possible to determine that the exhaust state can achieve the target boost pressure. When the maximum driving force Pmax is greater than or equal to the target driving force Pct, the determination part 254 sets the transient determination flag "0," but on the other hand, when the maximum driving force Pmax is smaller than the target driving force Pct, it sets the transient determination flag "1."

After this, the switching between the first feedback control and the second feedback control corresponding to the transient determination flag by the valve control part 55, or the contents of the first feedback control and the second feedback control are same as those of the embodiment 1.

In this way, the determination part 254 determines whether or not the exhaust state can achieve the target boost pressure based on the driving force of the compressor 4a. The maximum driving force Pmax is related to the currently achievable maximum boost pressure. The maximum boost pressure is the boost pressure at which all exhaust is flowed to the turbine 4b by fully closing the WG valve 36, and is related to the exhaust total flow rate Qex. Thus, the maximum driving force Pmax is correlated with the exhaust state. On the other hand, the target driving force Pct is correlated with the target boost pressure. Therefore, by comparing the maximum driving force Pmax with the target driving force Pct, it is possible to determine whether or not the exhaust state can achieve the target boost pressure.

<Other Embodiments>

As explained above, the embodiments were described as an example of the disclosed technology according to the present invention. However, the presently disclosed technology is not limited to this, and is applicable to the embodiments that are appropriately changed, replaced, added to, omitted, and the like. Moreover, it is possible to make a new embodiment by combining each component described in the embodiments. In addition, among the components in the detail descriptions and the attached figures, not only necessary components to solve the problems are included, but also unnecessary components to solve the problems are included to exemplify the technology. Therefore, even though these unnecessary components are described in the attached figures or the detail descriptions, these unnecessary components should not be immediately identified as being necessary.

The embodiments might be composed as follows.

The component of the engine 100 is one example, but not limited to this component.

For example, the calculated values described above such as the predicted exhaust temperature T3, the turbine upstream pressure P3, and the turbine downstream pressure P4, may actually be detected by respective sensors.

Moreover, the calculation method of each kind of the quantity of state described above is no more than one example. For example, the calculation method of the target turbine flow rate is not limited to the above-described method as long as the target turbine flow rate can be calculated.

Although the valve opening degree WG is feedback controlled based on the target driving force Pct and the actual driving force Pc, it is not limited to this. For example, the correcting opening degree calculation part 58 may obtain the correcting opening degree WGb from the target boost pressure and the actual boost pressure, the target turbine flow rate and the actual turbine flow rate, or the target bypass flow rate and the actual bypass flow rate.

Likewise, although the turbine flow rate is feedback controlled based on the target driving force Pct and the actual driving force Pc, it is not limited to this. For example, the turbine flow rate correction part 53 may obtain the correcting flow rate Qtfb from the target boost pressure and the actual boost pressure, the target turbine flow rate and the actual turbine flow rate, or the target bypass flow rate and the actual bypass flow rate. Additionally, the feedback control of the target turbine flow rate Qtt may be omitted.

The determination parts 54 and 254 determine whether or not the exhaust state can achieve the target boost pressure based on the turbine flow rate or the driving force of the compressor 4a. However, the determination part can adopt arbitrary determination methods as long as it can determine whether or not the exhaust state can achieve the target boost pressure. For example, the determination part may determine the exhaust state by the opening degree of the WG valve 36. Thus, when the WG valve 36 is fully closed, all the exhaust total flow rate Qex flows to the turbine 4b. When the exhaust total flow rate Qex is concurrent with the target turbine flow rate Qtt, or when the exhaust total flow rate Qex is not the target turbine flow rate Qtt, this situation occurs. Thus, when the WG valve 36 is fully closed, in most cases, the exhaust state cannot achieve the target boost pressure.

Moreover, the exhaust state can be determined from various parameters such as the exhaust temperature, the exhaust pressure (the turbine upstream pressure, the turbine downstream pressure), and the exhaust flow rate.

In the second feedback control, although the calculation of the integrated value of the deviation (as one example, the driving force deviation $\Delta P$) is stopped when calculating the integral term FBi, an arbitrary method may be adopted as long as the influence of the deviation on the calculation of the integral term is reduced compared with the first feedback control. For example, in the second feedback control, the time for integrating the deviation may be shorter than that in the first feedback control. Accordingly, the integrated value of the deviation in the second feedback control tends to be calculated as a smaller value than that in the first feedback control. Otherwise, when the integrated value of the deviation is calculated by integrating the value of the deviation multiplied by a coefficient, the coefficient in the second feedback control may be made smaller than that in the first feedback control. For example, the deviation as it is may be integrated in the first feedback control, and the deviation that is made smaller by 30% may be integrated in the second feedback control. Hereby, the influence of the deviation on the calculation of the integral term can be also reduced.

INDUSTRIAL APPLICABILITY

As described above, the presently disclosed technology is useful for a control device of an engine having a turbocharger.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

100 Engine
10 Intake passage
20 Engine body
30 Exhaust passage
35 Turbine bypass passage (Bypass passage)
36 Wastegate (WG) valve
4 Turbocharger
4a Compressor
4b Turbine
50 ECU (Control device)

54 Determination part
55 Valve control part (Control part)

The invention claimed is:
1. A control system of an engine, the system comprising:
a turbocharger having a turbine that is provided to an exhaust passage and a compressor that is provided to an intake passage,
a turbine bypass passage for diverting exhaust around the turbine,
a wastegate valve that is provided to the turbine bypass passage for controlling a flow rate of the exhaust flowing in the turbine bypass passage, and
a control device executed on a processor including:
a valve control part, executed on the processor, for performing a feedback control of a boost pressure of the turbocharger based on a deviation between a target boost pressure and an actual boost pressure, and
a determination part, executed on the processor, for obtaining a target turbine flow rate that is a target value of the flow rate of the exhaust flowing to the turbine from the target boost pressure, for obtaining an exhaust total flow rate discharging from the engine, and for determining whether or not the exhaust total flow rate discharging from the engine in the exhaust passage is greater than or equal to the target turbine flow rate, such that the target boost pressure will be achieved, the target turbine flow rate being based on the target boost pressure,
wherein the feedback control includes at least an integral term, and when the determination part determines that the exhaust total flow rate is smaller than the target turbine flow rate such that the target boost pressure will not be achieved, the valve control part controls an opening degree of the wastegate valve so as to reduce an influence of the deviation on a calculation of the integral term compared to that when the exhaust total flow rate is greater than or equal to the target turbine flow rate such that the target boost pressure will be achieved.

2. The control system of the engine according to claim 1, wherein the valve control part calculates the integral term that is a correction amount corresponding to an integrated value from a time integration of a driving force deviation of the compressor calculated from the boost pressure, and when the determination part determines that the exhaust total flow rate is smaller than the target turbine flow rate such that the target boost pressure will not be achieved, the valve control part stops the calculation of the integrated value of the driving force deviation.

* * * * *